United States Patent

Stein et al.

[11] Patent Number: 5,897,134
[45] Date of Patent: Apr. 27, 1999

[54] VEHICLE OCCUPANT PROTECTION APPARATUS

[75] Inventors: Russel E. Stein, Leonard; Edward F. Elmer, Auburn Hills; Matthew C. Bollaert, Capac; Matthew J. Ferguson, Shelby, all of Mich.

[73] Assignee: TRW Vehicle Safety Systems Inc., Lyndhurst, Ohio

[21] Appl. No.: 08/874,955

[22] Filed: Jun. 13, 1997

[51] Int. Cl.⁶ ................................................. B60R 21/20
[52] U.S. Cl. ........................... 280/728.3; 280/728.2; 280/730.2
[58] Field of Search ............... 280/728.3, 728.2, 280/728.1, 730.1, 730.2

[56] References Cited

U.S. PATENT DOCUMENTS

| | | |
|---|---|---|
| 4,943,447 | 7/1990 | Nelson et al. . |
| 4,964,654 | 10/1990 | Bishop et al. ................ 280/728.2 |
| 5,242,192 | 9/1993 | Prescaro et al. . |
| 5,326,132 | 7/1994 | Musiol et al. ................ 280/728.1 |
| 5,358,270 | 10/1994 | Kuretake et al. . |
| 5,366,240 | 11/1994 | Hanabusa et al. . |
| 5,468,012 | 11/1995 | Mihm . |
| 5,527,062 | 6/1996 | Kreuzer ........................ 280/728.1 |
| 5,553,887 | 9/1996 | Karlow et al. ................ 280/730.2 |
| 5,609,355 | 3/1997 | Smydra et al. . |
| 5,615,910 | 4/1997 | Margetak et al. . |
| 5,645,295 | 7/1997 | White, Jr. et al. ............ 280/730.2 |
| 5,667,242 | 9/1997 | Slack et al. .................. 280/730.2 |
| 5,669,627 | 9/1997 | Marjanski et al. ............ 280/728.2 |

FOREIGN PATENT DOCUMENTS 5131888  5/1993  Japan .

OTHER PUBLICATIONS

Research Disclosure, Sep., 1996, No. 389, Kenneth Mason Publications Ltd., London, pp. 567 and 568.

*Primary Examiner*—Eric D. Culbreth
*Attorney, Agent, or Firm*—Tarolli, Sundheim, Covell, Tummino & Szabo

[57] ABSTRACT

A deployment structure (32) encloses and conceals an inflator (20) and an inflatable vehicle occupant protection device (12) in a vehicle. The deployment structure (32) is a unitary plastic part defining a deployment door (86) having a Class A surface (76). The unitary plastic part further defines a mounting flap (114) having an aperture (126), and another mounting flap (116) having another aperture (128). The mounting flaps (114 and 116) are movable relative to one another to positions in which the apertures (126 and 128) are aligned to receive a mounting stud (36) which supports the inflator (20) and the protection device (12) in the vehicle.

23 Claims, 4 Drawing Sheets

VEHICLE OCCUPANT PROTECTION APPARATUS

FIELD OF THE INVENTION

The present invention relates to an inflatable vehicle occupant protection device, and particularly relates to a deployment structure for covering the protection device in a vehicle.

BACKGROUND OF THE INVENTION

An inflatable vehicle occupant protection device, such as an air bag, is inflated when a vehicle experiences a crash. Inflation fluid is then directed to flow from an inflator into the air bag to inflate the air bag. When the air bag is inflated, it extends into the vehicle occupant compartment to protect an occupant of the vehicle from a forceful impact with parts of the vehicle as a result of the crash.

An air bag and an inflator are typically installed in a vehicle as parts of an air bag module. The module is an assembly of parts that are interconnected separately from the vehicle, and may include a reaction canister which contains the air bag and the inflator. When the module is installed in the vehicle, a deployment door conceals the air bag and the other parts of the module from view in the vehicle occupant compartment. The deployment door has a Class A surface which, as known in the art, is a surface that is readily visible in the vehicle occupant compartment. The deployment door is usually fastened directly to the reaction canister as a part of the module. The deployment door may also be fastened to the part of the vehicle upon which or in which the module is installed.

When the inflator is actuated, the reaction canister directs the inflation fluid to flow from the inflator into the air bag. As the inflation fluid enters the air bag, it moves the air bag outward from the reaction canister and against the deployment door. The deployment door is then opened by the air bag as the air bag inflates outward from the reaction canister and into the vehicle occupant compartment.

SUMMARY OF THE INVENTION

The present invention comprises a deployment structure which, when installed in a vehicle, encloses and conceals an inflator and an inflatable vehicle occupant protection device in the vehicle. The deployment structure comprises a unitary plastic part defining a deployment door with a Class A surface. The unitary plastic part further defines a mounting flap with an aperture, and another mounting flap with another aperture. The mounting flaps are movable to positions in which the apertures are aligned to receive a mounting stud which supports the inflator and the protection device in the vehicle.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF A PREFERRED EMBODIMENT

Figure 1:
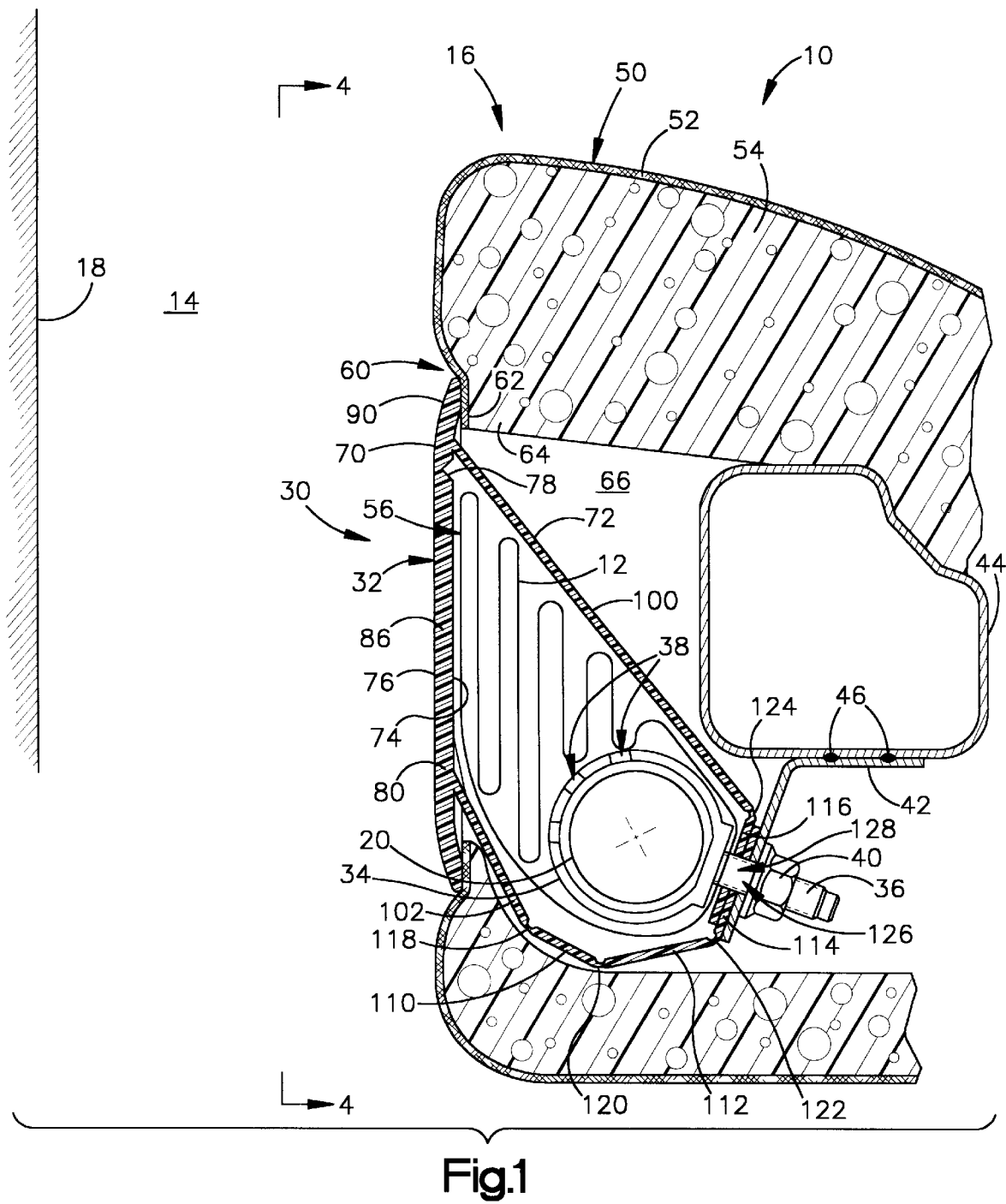
FIG. 1 is a schematic view of an apparatus comprising a first embodiment of the present invention.

An apparatus 10 comprising a preferred embodiment of the present invention is shown in FIG. 1. The apparatus 10 includes a particular type of inflatable vehicle occupant protection device 12 which is known as an air bag. The air bag 12 is inflatable from an uninflated condition, as shown in FIG. 1, to an inflated condition, as shown partially in FIG. 2. When the air bag 12 is in the inflated condition of FIG. 2, it extends into the vehicle occupant compartment 14 between a vehicle seat 16 and an adjacent door 18 at the side of the vehicle.

The apparatus 10 further includes an inflator 20 comprising a source of inflation fluid for inflating the air bag 12. As known in the art, the inflator 20 is a generally cylindrical part, and may contain ignitable gas generating material for generating a large volume of inflation gas. The inflator 20 may alternatively contain a stored quantity of pressurized inflation fluid, or a combination of pressurized inflation fluid and ignitable material for heating the inflation fluid.

Figure 2:
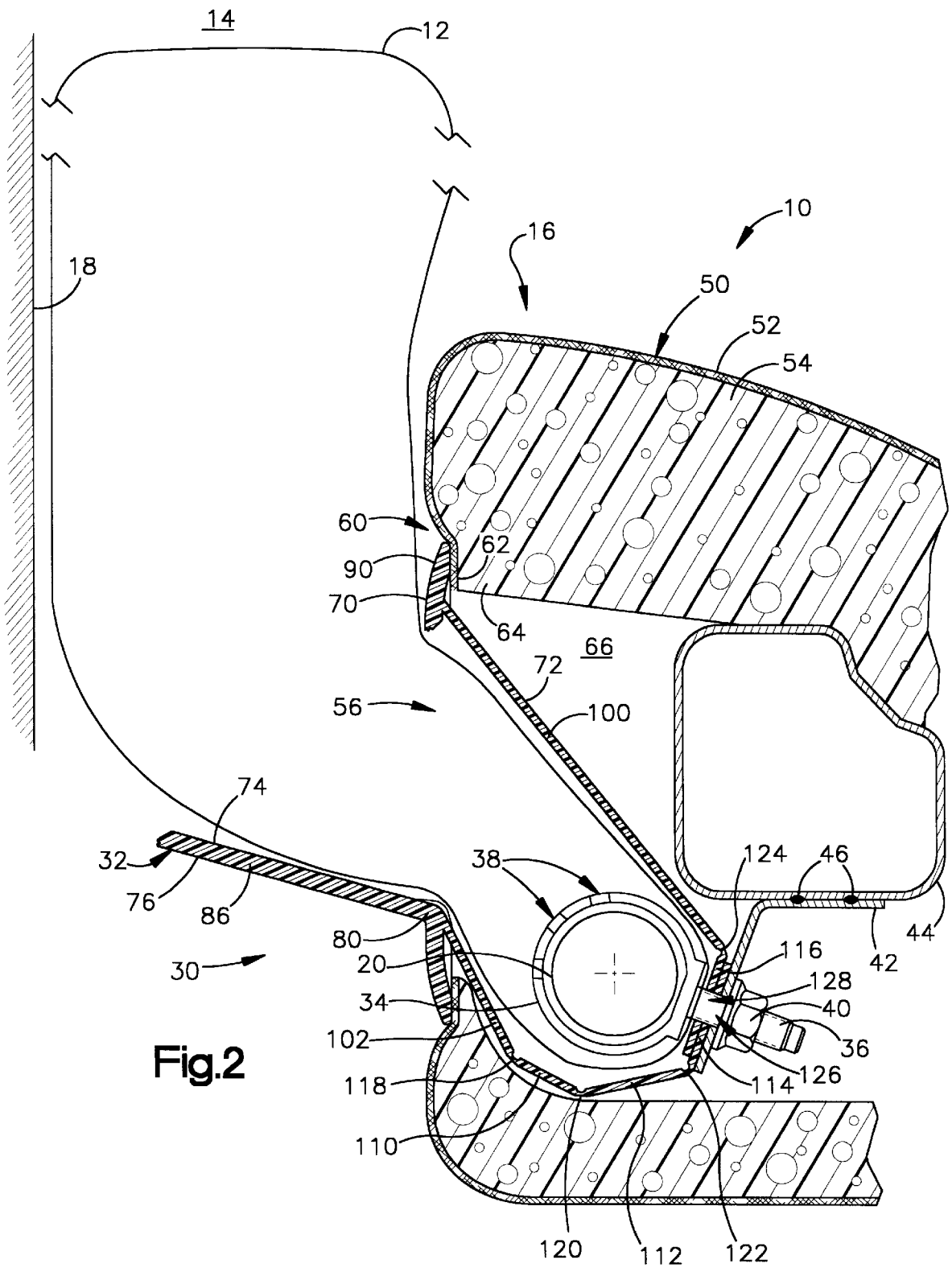
FIG. 2 is a view similar to FIG. 1 showing parts in different positions.
Figure 3:
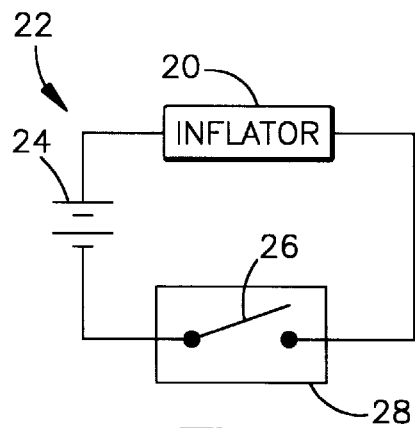
FIG. 3 is a schematic view of an electrical circuit including a part of the apparatus of FIG. 1.

As shown schematically in FIG. 3, the inflator 20 is included in an electrical circuit 22 with a power source 24 and a normally open switch 26. The power source 24 is preferably the vehicle battery and/or a capacitor. The switch 26 is part of a sensor 28 which senses a condition indicating the occurrence of a vehicle crash. In the preferred embodiment of the present invention shown in the drawings, the inflator 20 is actuated upon the occurrence of a side impact vehicle crash. In a side impact vehicle crash, an impact is directed against the vehicle in a direction extending across the vehicle between the door 18 and the seat 16, i.e., in a direction extending from side-to-side in the schematic views of FIGS. 1 and 2. Accordingly, the crash-indicating condition sensed by the sensor 28 may comprise, for example, sudden transverse vehicle acceleration or crushing of the door 18 or another side portion of the vehicle.

If the crash-indicating condition sensed by the sensor 28 is at or above a predetermined threshold level, it indicates the occurrence of a side impact crash having at least a predetermined threshold level of severity. The threshold level of crash severity is a level at which inflation of the air bag 12 is desired to help protect an occupant of the seat 16. The switch 26 then closes and electric current is directed to the inflator 20 to actuate the inflator 20. The inflator 20 then emits a large volume of inflation fluid which flows into the air bag 12 to inflate the air bag 12.

The air bag 12 and the inflator 20 are parts of an air bag module 30. The module 30 is an assembly of parts that are interconnected separately from the vehicle seat 16. In addition to the air bag 12 and the inflator 20, the interconnected parts of the module 30 include a deployment structure 32, a diffuser 34, and a pair of mounting studs 36 (one of which is shown in FIG. 2) projecting from the diffuser 34. The deployment structure 32 encloses and conceals the other parts of the module 30 from view in the vehicle occupant compartment 14. The diffuser 34 is a generally cylindrical part surrounding the inflator 20 and has a plurality of openings 38 for directing inflation fluid to flow radially outward from the inflator 20 to the air bag 12. The mounting studs 36 and a corresponding plurality of nuts 40 fasten the module 30 to a mounting bracket 42 which, in turn, is fastened to the frame 44 of the seat 16 by welds 46. The frame 44 may be either the seat back frame or the seat bottom frame. As described fully below, the module 30 does not include a reaction canister.

Figure 4:
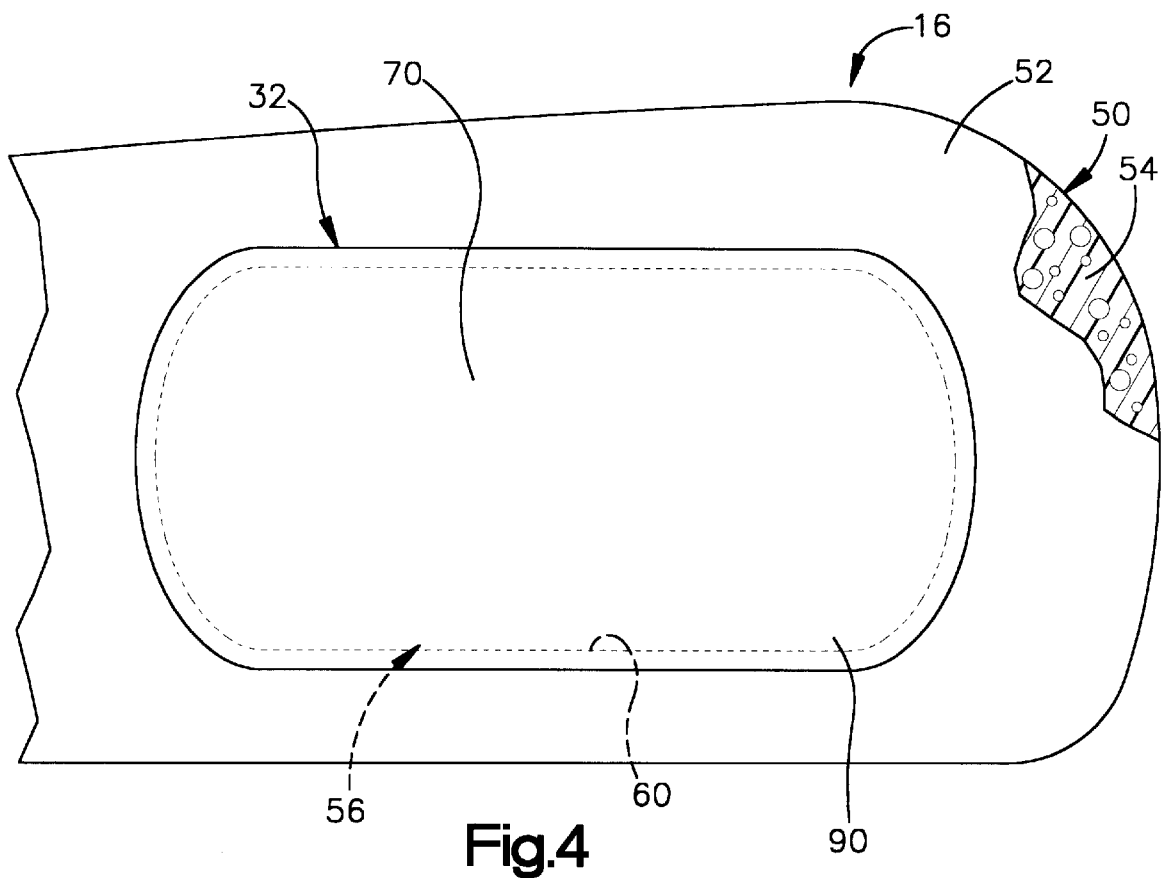
FIG. 4 is a view taken on line 4—4 of FIG. 1.

A seat cushion 50 covers the frame 44. The seat cushion 50 includes a cover layer 52 on a compressible base 54. The cover layer 52 is preferably formed of fabric or leather. The base 54 is preferably formed of elastomeric foam. The cover layer 52 and the base 54 together define a deployment opening 56 at the side of the seat cushion 50 facing the door 18. More specifically, the seat cushion 50 has an edge portion 60 defined by adjoining, co-extensive edge portions 62 and 64 of the cover layer 52 and the base 54. The edge portion 60 of the seat cushion 50 extends continuously around the deployment opening 56 so as to define the perimeter and the peripheral shape of the deployment opening 56. Although the deployment opening 56 has a generally rectangular peripheral shape with rounded corners and rounded ends, as shown in FIG. 4, it could alternatively have any other suitable peripheral shape. The seat cushion 50 further defines a cavity 66 extending inward from the deployment opening 56 to the frame 44. The air bag module 30 is received in the cavity 66, and is mounted on the frame 44 within the cavity 66 in the manner described above.

Figure 5:
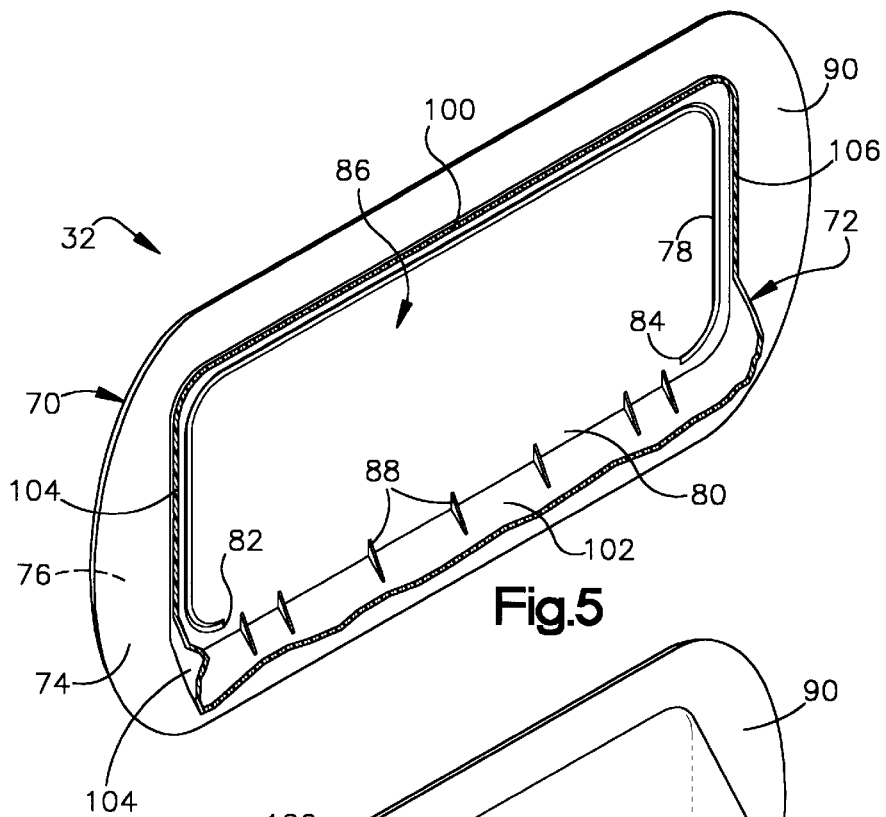
FIG. 5 is a partial isometric view of a part of the apparatus of FIG. 1.
Figure 6:
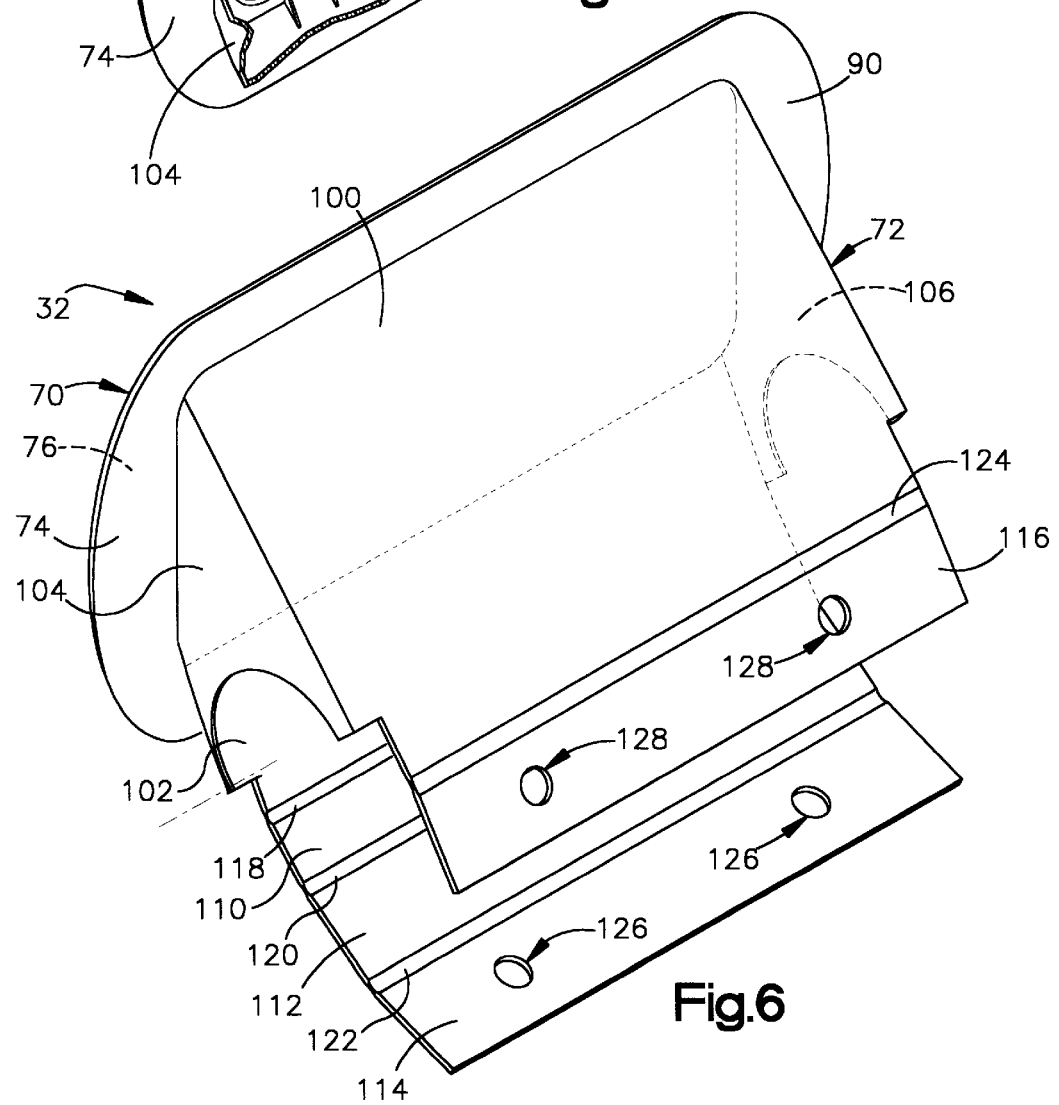
FIG. 6 is a full isometric view of the part shown partially in FIG. 5.

As shown in FIGS. 5 and 6, the deployment structure 32 includes a panel 70, and further includes an enclosure wall structure 72 projecting from one side of the panel 70. The deployment structure 32 in the preferred embodiment of the present invention is a unitary part consisting of a single, continuous body of molded plastic material which defines both the panel 70 and the enclosure wall structure 72. This can be accomplished with any suitable injection molding process known in the art, and with any suitable plastic material such as, for example, Dupont DYM 350 or DYM 500.

The panel 70 has oppositely facing inner and outer side surfaces 74 and 76. The entire outer side surface 76 is a Class A surface. The outer side surface 76 may thus have any finish suitable for continuing the trim theme of the vehicle at the side of the seat 16.

The inner side surface 74 of the panel 70 has a notch 78 which is elongated in a generally U-shaped configuration (FIG. 5). The notch 78 defines a coextensive stress riser which is rupturable under the influence of the inflating air bag 12, as described below. A hinge portion 80 of the panel 70 extends longitudinally between opposite ends 82 and 84 of the notch 78. In this configuration, the notch 78 defines three sides of a generally rectangular deployment door 86 within the panel 70. The hinge 80 supports the deployment door 86 for pivotal movement from a closed position (FIG. 1) to an open position (FIG. 2) upon rupturing of the stress riser at the notch 78.

As indicated in FIG. 2, the hinge 80 is a living hinge. By "living hinge" it is meant that the plastic material at the hinge 84 does not rupture under stress induced by the inflating air bag 12. In accordance with this feature of the present invention, a plurality of gussets 88 (FIG. 5) are preferably included in the structure of the panel 70 to reinforce panel 70 at the hinge 80.

A peripheral edge portion 90 of the panel 70 fully surrounds the deployment door 86, the notch 78 and the hinge 80. The peripheral edge portion 90 provides the panel 70 with a shape that closely matches the shape of the deployment opening 56 in the seat cushion 50. However, the panel 70 is substantially larger than the deployment opening 56.

The panel 70 thus extends fully across the deployment opening 56 to close the deployment opening 56, and also projects outward from the deployment opening 56 such that the edge portion 90 of the panel 70 overlies the edge portion 60 of the seat cushion 50 fully around the deployment opening 56. The edge portion 90 of the panel 70 preferably applies a compressive load to the edge portion 60 of the seat cushion 50. This causes the edge portion 64 of the base 54 to be compressed. The compressed edge portion 64 of the base 54 exerts an elastic bias outward against the panel 70 to ensure that the panel 70 is engaged firmly with the seat cushion 50 fully around the deployment opening 56 without being fastened directly to the seat cushion 50.

The enclosure wall structure 72 has a generally rectangular configuration defined by an opposed pair of side walls 100 and 102 and an opposed pair of end walls 104 and 106 (FIGS. 5 and 6). The walls 100–106 project from the inner side surface 74 of the panel 70 at the peripheral edge portion 90 of the panel 70. Accordingly, the enclosure wall structure 72 also surrounds the deployment door 86, the notch 78 and the hinge 80. The gussets 88 extend across the hinge 80 between the deployment door 86 and the adjacent side wall 102.

As best shown in FIG. 6, the enclosure wall structure 72 has a plurality of elongated mounting flaps projecting from the side walls 100 and 102. These include first, second and third mounting flaps 110, 112 and 114 projecting successively from one side wall 102, and a fourth mounting flap 116 projecting from the other side wall 100. A first living hinge 118 connects the first mounting flap 110 directly to the adjacent side wall 102. Second and third living hinges 120 and 122 interconnect the second and third mounting flaps 112 and 114 with the first mounting flap 110. A fourth living hinge 124 connects the fourth mounting flap 116 directly to the other side wall 100. The living hinges 118–124 are defined by relatively thin sections of the plastic material of which the deployment structure 32 is formed. A plurality of apertures 126 (preferably two) extend through the third mounting flap 114. A matching plurality of apertures 128 extend through the fourth mounting flap 116.

When the module 30 is being assembled, the inflator 20 is first inserted and secured within the diffuser 34 in a known manner. The inflator 20 and the diffuser 34 are then received together within the air bag 12. The air bag 12 preferably has a pair of apertures (not shown) through which the mounting studs 36 extend outward from within the air bag 12. However, the air bag 12, the diffuser 34 and the inflator 20 can be interconnected in any other suitable manner known in the art. Those interconnected parts of the module 30 are received within the enclosure wall structure 72, as shown in FIG. 1. The mounting flaps 110–116 are then moved pivotally about the living hinges 118–124 to adjoining positions in which the mounting studs 36 extend outward through aligned pairs of the apertures 126 and 128. The air bag 12, the inflator 20 and the diffuser 34 are thus enclosed within the enclosure wall structure 72. The nuts 40 are then used to fasten the assembled module 30 to the mounting bracket 42.

When the air bag 12 is inflated, it moves outward against the panel 70 on the deployment structure 32. The stress riser at the notch 78 ruptures under stress induced by the inflation fluid pressure in the air bag 12. The deployment door 86 is then opened by the air bag 12 as the air bag 12 emerges from the enclosure wall structure 72 and moves outward from the seat 16 into the vehicle occupant compartment 14.

The inflating air bag 12 moves against the enclosure wall structure 72 as the inflation fluid flows radially outward from the diffuser 34. Importantly, the walls 100–106 and the living hinges 118–122 all remain intact without rupturing under the stress induced by the inflation fluid pressure in the air bag 12, and together constrain the air bag 12 to move toward and against the deployment door 86. The deployment structure 32 constructed in accordance with the present invention thus performs the functions of a reaction canister in addition to closing the deployment opening 56 and concealing the other parts of the module 30 from view in the vehicle occupant compartment 14.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a deployment structure which, when installed in a vehicle, encloses and conceals an inflator and an inflatable vehicle occupant protection device in the vehicle;
   said deployment structure comprising a unitary plastic part defining a deployment door having a Class A surface, a mounting flap having an aperture, and another mounting flap having another aperture;
   said mounting flaps being movable relative to one another to positions in which said apertures are aligned to receive a mounting stud which supports the inflator and the protection device in the vehicle;
   said deployment door being bounded in part by a rupturable stress riser and in part by a hinge extending between opposite ends of said stress riser;
   said Class A surface fully covering said deployment door, said stress riser and said hinge.

2. Apparatus as defined in claim 1 wherein said unitary plastic part is a single continuous body of injection molded plastic material.

3. Apparatus comprising:
   a deployment structure which, when installed in a vehicle, encloses and conceals an inflator and an inflatable vehicle occupant protection device in the vehicle;
   said deployment structure comprising a unitary plastic part defining a deployment door having a Class A surface, a mounting flap having an aperture, and another mounting flap having another aperture;
   said mounting flaps being movable relative to one another to positions in which said apertures are aligned to receive a mounting stud which supports the inflator and the protection device in the vehicle;
   said unitary plastic part having means for defining living hinges for said mounting flaps.

4. Apparatus as defined in claim 3 wherein said unitary plastic part is a single continuous body of injection molded plastic material.

5. Apparatus comprising:
   an inflatable vehicle occupant protection device;
   an inflator;
   a diffuser;
   a mounting stud projecting from said diffuser; and
   a deployment structure comprising a unitary plastic part having a door portion, a hinge portion supporting said door portion for pivotal movement to an open position under the influence of said protection device, and an enclosure portion containing said protection device, said inflator and said diffuser, said enclosure portion having an aperture receiving said mounting stud;
   said protection device, said inflator, said diffuser, said mounting stud and said deployment structure being interconnected parts of a module, said module being free of a reaction canister containing said inflator and said diffuser;
   said enclosure portion of said unitary plastic part including a pair of mounting flaps having aligned apertures receiving said mounting stud;
   said enclosure portion of said unitary plastic part further having means for defining living hinges for said mounting flaps.

6. Apparatus as defined in claim 5 wherein said door portion of said unitary plastic part has an outer side surface comprising a Class A surface.

7. Apparatus as defined in claim 5 wherein said unitary plastic part is a single continuous body of injection molded plastic material.

8. Apparatus comprising:
   a vehicle part having a structural portion and a trim portion covering said structural portion, said trim portion of said vehicle part having a deployment opening;
   an inflatable vehicle occupant protection device;
   a mounting stud supporting said protection device on said structural portion of said vehicle part; and
   a deployment structure comprising a unitary plastic part having a panel portion closing said deployment opening and a pair of mounting portions with aligned apertures receiving said mounting stud;
   said panel portion of said unitary plastic part being free of a direct connection with said trim portion of said vehicle part;
   said panel portion of said unitary plastic part overlying said trim portion of said vehicle part entirely around the periphery of said deployment opening.

9. Apparatus as defined in claim 8 wherein said trim portion of said vehicle part is elastically compressed under a load applied by said panel portion of said unitary plastic part.

10. Apparatus as defined in claim 8 wherein said protection device and said deployment structure are parts of a module which is assembled separately from said vehicle part, said module being free of a reaction canister.

11. Apparatus as defined in claim 8 wherein said unitary plastic part is a single continuous body of injection molded plastic material.

12. Apparatus as defined in claim 8 wherein said mounting portions of said unitary plastic part comprise pivotal mounting flaps having said aligned apertures.

13. Apparatus as defined in claim 8 wherein said panel portion of said unitary plastic part has a Class A surface facing outward of said deployment opening.

14. Apparatus comprising:
   a vehicle part having a structural portion and a trim portion covering said structural portion, said trim portion of said vehicle part having a deployment opening;
   an inflatable vehicle occupant protection device;
   a mounting stud supporting said protection device on said structural portion of said vehicle part; and
   a deployment structure comprising a unitary plastic part having a panel portion closing said deployment opening and a pair of mounting portions with aligned apertures receiving said mounting stud;
   said mounting portions of said unitary plastic part comprising pivotal mounting flaps having said aligned apertures;

said unitary plastic part having means for defining living hinges for said mounting flaps.

15. Apparatus as defined in claim 14 wherein said panel portion of said unitary plastic part has a class A surface facing outward of said deployment opening.

16. Apparatus as defined in claim 14 wherein said panel portion of said unitary plastic part is free of a direct connection with said trim portion of said vehicle part.

17. Apparatus as defined in claim 14 wherein said protection device and said deployment structure are parts of a module which is assembled separately from said vehicle part, said module being free of a reaction canister.

18. Apparatus as defined in claim 14 wherein said unitary plastic part is a single continuous body of injection molded plastic material.

19. Apparatus comprising:

a vehicle seat including a frame and a cushion covering said frame, said cushion having a deployment opening; and a module comprising a plurality of parts which are interconnected separately from said seat, said parts of said module including an inflatable vehicle occupant protection device and a mounting stud, said mounting stud supporting said module on said frame;

said parts of said module further including a deployment structure comprising a unitary plastic part having a panel portion closing said deployment opening and an enclosure portion containing said protection device, said enclosure portion having an aperture receiving said mounting stud;

said enclosure portion of said unitary plastic part including a pair of mounting flaps having aligned apertures receiving said mounting stud;

said enclosure portion of said unitary plastic part further having means for defining living hinges for said mounting flaps.

20. Apparatus as defined in claim 19 wherein said panel portion of said unitary plastic part has a Class A surface facing outward of said deployment opening.

21. Apparatus as defined in claim 19 wherein said panel portion of said unitary plastic part is free of a direct connection with said seat cushion.

22. Apparatus as defined in claim 19 wherein said module is free of a reaction canister.

23. Apparatus as defined in claim 19 wherein said unitary plastic part is a single continuous body of injection molded plastic material.

* * * * *